3,171,757
FUEL CELL ELECTRODES AND METHOD OF MAKING THE SAME

Joseph C. Duddy, Trevose, Pa., assignor to The Electric Storage Battery Company, a corporation of New Jersey
No Drawing. Filed Sept. 12, 1961, Ser. No. 137,512
15 Claims. (Cl. 117—217)

The present invention generally relates to new and improved electrodes for the direct production of electrical energy from fuels by electrochemical means and to the method for making the same. More specifically, the present invention is concerned with a new and improved method for providing in a fuel cell electrode catalytically active sites for the cell reaction.

Platinum, palladium, and the other metals of the platinum group as well as silver and nickel are known to be highly catalytically active in the promotion of the electrochemical reaction of a fuel cell. The extent and character of the surface presented by such catalytic materials in an electrode is an important factor in controlling electrode performance. One means of insuring a large catalytically active surface in an electrode is to utilize large quantities of catalytically active material. Inasmuch as most of the highly catalytically active materials are noble metals, however, their high cost makes their extensive use economically unfeasible. Accordingly, economic considerations dictate that these catalytic materials be utilized in the most efficient manner possible.

It is a specific object of the present invention to provide a means for assuring efficient disposition of catalytically active materials in fuel cell electrodes thereby reducing to a minimum the amount of such material which must be present in fuel cell electrodes to assure satisfactory performance.

One means for achieving a large catalytically active surface area in an electrode is to utilize the catalytic material in the finest available particle size and to preserve that particle size during the processing of the electrode.

A further object of the present invention is to provide a means providing for the efficient disposition of such a finely divided catalytic material within an electrode.

In accordance with the present invention, there is provided a method of impregnating a fuel cell electrode utilizing a colloidal suspension of catalytic material which suspension is forced under pressure through the pores of an electrode which act as filters to remove the suspended catalyst from the filtrate. This not only permits the utilization of the finest possible form of catalytic material, but it also provides for the disposition of this catalytic material directly in the electrode pore where subsequently in operation it will be at the ultimate reaction interface between the pore, fuel gas or fuel liquid and the electrolyte. To assure that the catalytically active material deposited within the electrode pores is of the finest available particle size the colloidal suspensions are preferably prepared using the catalytically active material in the oxide form and the latter reduced to its metallic form in situ within the electrode pores. Where the deposited catalyst is an oxide, the deposition of it in the electrode pores and its reduction can be accomplished in a single step by utilizing a reducing agent to force the suspension through the electrode pores. Further in accordance with the present invention, after the deposition of the catalyst in the porous electrode structure has been achieved and it has been reduced in situ, it is then secured in the pores by depositing thereon a metallic coating, preferably of the catalytic material itself. This deposit may be made by electroplating techniques or by electroless or chemical deposition.

Other objects and advantages of the present invention will become apparent from the following detailed description of the preferred embodiments thereof.

In carrying out one form of the present invention, a colloidal suspension of finely divided palladium oxide is prepared as a by-product in the preparation of electrodes in accordance with the teachings of my co-pending applications, Serial Nos. 818,638 and 818,677, both filed June 8, 1959, utilizing finely divided silver and palladium oxide as its catalytic constituents. As disclosed in these applications, electrodes are prepared by intimately mixing a first plasticized thermoplastic resin and a second plasticized thermoplastic resin and the electrode active material to produce a plasticized mass. The first thermoplastic resin is selected so as to be substantially insoluble in the second thermoplastic resin and soluble in a solvent in which the second thermoplastic resin and the electrode active material are insoluble. After the intimate mixing of the two plasticized resins and the electrode active material the mixture is shaped as by calendering or extruding to produce an electrode. Following the shaping of the material or other such treatment as is required to produce the electrode, the first thermoplastic resin, the soluble resin, is leached from the electrode by a bath in a suitable solvent leading the electrode active material bound in a permanent microporous matrix of the insoluble thermoplastic resin. As further disclosed in the aforementioned co-pending applications, polyethylene and polyethylene oxide may be utilized as the permanent and temporary resin binders respectively, the polyethylene oxide being removed in a water bath. Where palladium oxide is utilized as part of the electrode material, the water used to remove the polyethylene oxide from the electrode has been found to have suspended in it finely divided particles of palladium oxide. A suspension of palladium oxide formed in this manner may be utilized for impregnating electrodes in accordance with the teachings of the present invention.

A specific formulation which may be utilized to prepare the aforementioned fuel cell electrodes and to produce the colloidal suspension of palladium oxide for use in practicing the present invention is prepared by intimately mixing under heat and pressure the following materials:

35 grams of polyethylene
30 grams of polyethylene oxide
475 grams of finely divided silver
51 grams of finely divided palladium oxide The mixing of these ingredients is accomplished on a two-roll rubber mill in which the rollers are operated at differential speeds. A temperature of about 275° F. has been found to be applicable for plasticizing the resins and a time interval on the order of six minutes is adequate for the thorough and intimate mixing of the resins, the silver, and the palladium oxide. After the mixing is completed the mixture is removed from the mill and sheeted between calendering rolls operated at a temperature of 230° F. to produce sheet material suitable for fabrication into a fuel cell electrode. The sheet material thus produced is then soaked in a water bath to remove the polyethylene oxide which is water soluble. Upon the completion of this leaching step, the leaching water has a light brown color and the application of a light beam thereto produces the Tyndall effect common to colloidal suspensions.

An analysis of this leach water has proven that the suspended particles are palladium oxide. These particles represent the finer species of the oxide particles which had been incorporated into the plastic matrix and were so fine that they were removed from the matrix with the soluble resin phase. In this respect it should be noted that the suspension of these particles in the leach water can be partially attributed to the dispersing and stabilizing properties of the polyethylene oxide in solution. As will be appreciated by those skilled in the art, since the suspended particles of palladium oxide were of such a fine particle size as to be lost from the electrode, and be actually suspended in the leach water, that they also, because of their fineness, are the particles which can exhibit the highest degree of catalytic activity. While this method of preparing a suspension of catalyst has proven to be effective and, since it is prepared as a by-product, also proven to be economical, it should be understood that it it only illustrative and that other means for accomplishing the same may be utilized. For example, catalysts may be suspended in water or other liquids for use in the present invention by other known methods such as by conventional dispersion or condensation techniques.

Following the preparation of a suspension of catalytic material in a liquid phase as described above, a pressure cell is constructed utilizing as one wall thereof the porous fuel cell electrode to be impregnated with the suspended catalyst. By way of example, a cell was constructed having a cylindrical outer wall and a concentric cylindrical sintered fuel cell electrode as its inner wall. These wall elements were positioned concentrically and sealed together at their ends. The suspension prepared as noted above was then introduced into the region between the walls of this cell. A pressure fitting was then made to this cell and hydrogen gas at a suitable pressure was applied to the suspension. Under these conditions, the fuel cell electrode filtered the suspended palladium oxide from the leach water and more significantly, the palladium oxide was deposited into pores of the electrode where it would ultimately provide catalytically active sites for the electrode reaction. As will be understood, the amount of colloidal material deposited in the electrode pores may be increased by repeating this operation. It should also be understood that any electrode may be impregnated in this manner providing its pores are small enough or tortuous enough to trap the suspended catalyst.

During the impregnation of the electrode it was noticed that the uppermost region of the colloidal suspension in the pressure cylinder clouded with a darkened deposit. This phenomenon is explained by an interfacial reduction of the palladium oxide to metallic palladium and this reaction was continued by the passage of hydrogen through the electrode pores after all of the colloidal suspension had been filtered thereby to reduce the palladium oxide to the metal in situ in the pores. It should be noted that any gas or other means of applying pressure to the suspension can be utilized to force the suspension through the electrode pores and that the catalyst may be reduced in situ by a subsequent application of the reducing gas or by any appropriate means such as by a chemical reducing agent. The utilization of a reducing gas as described above, however, does accomplish the two steps in a single operation. With certain types of electrodes, a single pass of a suspension therethrough is sufficient to completely remove all the colloidally suspended catalyst as evidenced by the lack of a Tyndall effect. An analysis of a colloidal suspension prepared as described hereinbefore indicates the presence of finely divided palladium oxide in a range of from between 0.01 gram to 0.02 gram per liter of water.

Following the deposition of the palladium oxide in the electrode pores and the reduction of the oxide to palladium metal in situ, the catalytic particles were secured in the pores by depositing therein an anchoring layer also of palladium. For this purpose, the impregnated electrode was immersed in a bath containing 5 grams per liter of metallic palladium in the form of tetramminepalladium, 280 grams per liter ammonium hydroxide (29%) and 8 grams per liter of the disodium salt of ethylene-diamine-tetraacetic acid. This bath was maintained at 95° F. and forced into the pores of the electrode and 1 mole per liter of hydrazine added thereto. The electrode was allowed to remain in this plating bath a time sufficient to produce a visible deposit thereon characterized by a dull gray color.

In order to demonstrate the effectiveness of the impregnation of a fuel cell electrode with catalytic material in accordance with the teachings of the present invention, a concentric hydrogen-oxygen fuel cell was constructed. This cell utilized two concentric cylindrical electrodes, the outer electrode being an oxygen electrode and the inner electrode a hydrogen electrode. Three separate hydrogen electrodes labeled "A," "B," and "C," identical in all respects except as noted hereinafter, were tested in this cell. Electrode "A" comprised a porous sintered cylinder containing 90% by weight of finely divided silver and 10% by weight of finely divided palladium. Electrode "B" comprised a porous sintered cylinder of silver having a coating of palladium chemically deposited thereon by the process described hereinbefore and contained 1.0% by weight of palladium. Electrode "C" was an electrode in accordance with the present invention made as disclosed hereinbefore and contained 0.5% by weight of palladium of which 0.05% was colloidally deposited. The oxygen electrode has a projected inner wall surface area of 33.9 sq. in. and each of the hydrogen electrodes had a projected outer wall surface area of 23.6 sq. in. The space between these concentric electrodes was ⅛" and contained a 27% solution of potassium hydroxide. For these tests oxygen was delivered to the oxygen electrode at a pressure of 7½ lbs./sq. in. and hydrogen was delivered to the hydrogen electrodes at a pressure of 3 lbs./sq. in. The results of the tests of the three electrodes are shown in the table below in which cell voltages for current loads are noted.

| Cell Current | Cell Voltage, volts | | |
| --- | --- | --- | --- |
| | Electrode "A" | Electrode "B" | Electrode "C" |
| Open Circuit | 1.08 | 1.08 | 1.08 |
| 0.5 Amps | 0.98 | 0.93 | 1.03 |
| 1.0 Amps | 0.95 | 0.86 | 1.00 |
| 2.5 Amps | 0.91 | 0.75 | 0.96 |
| 5.0 Amps | 0.84 | 0.63 | 0.89 |
| 10.0 Amps | 0.72 | 0.45 | 0.77 |
| 15.0 Amps | 0.62 | 0.30 | 0.67 |

As can be seen from the table, electrode "C," the electrode impregnated in accordance with the present invention, provided a cell voltage 50 millivolts higher throughout cell operation than that provided by electrode "A," the prior art electrode, despite the fact that the catalytic content of electrode "C" was substantially less than that of electrode "A." These results attest to the effectiveness of the deposition of catalytic material in accordance with the teachings of the present invention. As can be seen from the voltages produced by the cell with electrode "B," the increase in efficiency of the electrode "C" is due for the most part to the colloidally deposited catalyst and not to the anchoring coating.

In considering the present invention, it should be understood that while in the embodiment of the present invention described hereinbefore, the catalytic material deposited in the electrode pores was palladium oxide, that the method of the present invention is applicable to other metallic catalytic material, as for example, platinum and other metals of the platinum group, as well as silver, nickel, and gold. It should also be understood that while the anchoring deposit of catalytic material described hereinbefore was made by means of chemical reduction, that it may be made by other known means as by means of electroplating, or vapor deposition and the like. In addition, other means of applying pressure to the suspension may be utilized as for example, applying direct piston pressure as opposed to the gas pressure utilized in the embodiment of the invention described hereinbefore. Also, it is not necessary that water or a solution of water and polyethylene oxide be utilized as the suspending medium for the catalyst. Other liquids or other liquids and colloid stabilizing agents may be utilized in preparing the suspension used provided that they do not react with the catalyst or the electrode matrix. From the foregoing, it can be seen that the method of the present invention provides a means for depositing minute particles of catalytically active material at sites in the fuel cell electrode where it will ultimately provide for the most efficient utilization of its catalytic properties.

Having described the present invention that which is claimed as new is:

1. A method of impregnating a porous fuel cell electrode with a metallic catalyst comprising the steps of preparing a colloidal suspension of said catalyst, forcing said colloidal suspension through the pores of said fuel cell electrode, said electrode acting as a filter to entrap in said pores said suspended catalyst, and securing said catalyst in said pores by plating thereon a metallic coating.

2. The method of claim 1 wherein said metallic coating is of the catalytic material.

3. A method of impregnating a porous fuel cell electrode with metallic catalytic material comprising the steps of preparing a colloidal suspension of said catalytic material, forcing said colloidal suspension through the pores of said fuel cell electrode, said electrode acting as a filter to entrap in said pores said suspended catalyst, and plating in said pores a metallic coating to anchor said catalytic material.

4. The method of claim 3 wherein said catalytic material is in an oxide form and is reduced in situ in said pores prior to plating said metallic coating.

5. A method of impregnating a porous fuel cell electrode with a metallic catalytic material comprising the steps of preparing a colloidal suspension of said catalytic material in its oxide form, forcing said colloidal suspension through the pores of said fuel cell electrode, said electrode acting as a filter to entrap in said pores said suspended catalyst, reducing said catalytic material to a metal in situ in said pores, and anchoring said catalyst in said pores by depositing a metallic coating of said catalyst in said pores.

6. The method of claim 5 wherein said catalyst is reduced from an oxide to a metal by means of a reducing atmosphere.

7. The method of claim 5 wherein said suspension is forced through said fuel cell pores by means of gas pressure.

8. The method of claim 7 wherein said gas is a reducing gas.

9. A method of impregnating a porous fuel cell electrode with a metallic catalyst comprising the steps of preparing a colloidal suspension of said catalyst and a liquid inert to said catalyst and said electrode, forcing said colloidal suspension through the pores of said fuel cell electrode, said electrode acting as a filter to remove said suspended catalyst from said liquid, and securing said removed catalyst in said pores by plating thereon a metallic coating.

10. The method of claim 9 wherein said catalyst is selected from the group consisting of metals of the platinum group, silver, nickel, and gold.

11. A method of impregnating a porous fuel cell electrode with a metallic catalyst comprising the steps of preparing a colloidal suspension of said catalytic material in water by means of a suspending agent, forcing the colloidal suspension through the pores of said fuel cell electrode by means of gas pressure, said electrode acting as a filter to remove said suspended catalyst from said water, and securing said removed catalyst in the pores of said electrode by plating thereon a coating of said catalyst.

12. The method of claim 11 wherein said catalyst is selected from the group consisting of metals of the platinum group, silver, nickel, and gold.

13. A method of impregnating a sintered porous matrix for fuel cell applications which comprises the steps of suspending finely divided palladium oxide in a solution of water and polyethylene oxide, said polyethylene oxide acting as a suspending agent, forcing said suspension through said porous matrix, said matrix acting as a filter entrapping in said pores said palladium oxide, reducing said palladium oxide to metallic palladium in situ in said pores, and anchoring said palladium in said pores by chemically reducing therein a layer of metallic palladium.

14. The method of claim 13 wherein said suspension is forced through said matrix by means of gas pressure.

15. The method of claim 14 wherein said gas is hydrogen.

References Cited by the Examiner

UNITED STATES PATENTS

| 2,847,332 | 12/58 | Ramadanoff | 117—228 |
| 3,020,327 | 2/62 | Ruetschi | 136—28 X |
| 3,040,115 | 6/62 | Moss | 136—86 X |

FOREIGN PATENTS

| 723,022 | 2/55 | Great Britain. |
| 844,584 | 8/60 | Great Britain. |
| 547,536 | 10/57 | Canada. |

OTHER REFERENCES

Davidson et al.: Water-Soluble Resins, Reinhold Publishing Corp., page 192, 1962, TP 978 D3 C3.

RICHARD D. NEVIUS, *Primary Examiner.*